US009218561B2

(12) United States Patent
Yilmaz (10) Patent No.: US 9,218,561 B2
(45) Date of Patent: Dec. 22, 2015

(54) TOUCH SENSOR WITH RFID

(75) Inventor: Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 501 days.

(21) Appl. No.: 13/115,340

(22) Filed: May 25, 2011

(65) Prior Publication Data

US 2012/0299863 A1    Nov. 29, 2012

(51) Int. Cl.
*G06F 3/045* (2006.01)
*G06K 19/077* (2006.01)

(52) U.S. Cl.
CPC ................. *G06K 19/07758* (2013.01)

(58) Field of Classification Search
None
See application file for complete search history.

(56) References Cited

U.S. PATENT DOCUMENTS

| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 2006/0017659 | A1 * | 1/2006 | Ogawa et al. .................. 345/30 |
| 2009/0167699 | A1 * | 7/2009 | Rosenblatt et al. ........... 345/173 |
| 2009/0315854 | A1 | 12/2009 | Matsuo |
| 2010/0123581 | A1 * | 5/2010 | Hatfield et al. ............. 340/572.3 |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2012/0293307 | A1 * | 11/2012 | Djuric et al. ................. 340/10.2 |
| 2013/0076612 | A1 | 3/2013 | Myers |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Joseph Haley
*Assistant Examiner* — Ifedayo Iluyomade
(74) *Attorney, Agent, or Firm* — Baker Botts LLP (57) ABSTRACT

The examples describe the integration of a RFID tag with a touch sensor.

20 Claims, 8 Drawing Sheets

TOUCH SENSOR WITH RFID

BACKGROUND

A touch position sensor is a device that can detect the presence and location of a touch by a finger or by another object, such as a stylus. A touch position sensor, for example, can detect the presence and location of a touch within an area of an external interface of the touch position sensor. In a touch sensitive display application, the touch position sensor enables direct interaction with what is displayed on the screen, rather than indirectly with a mouse or touchpad.

Touch position sensors can be attached to or provided as part of electronic devices, such as computers, personal digital assistants, satellite navigation devices, mobile telephones, portable media players, portable game consoles, public information kiosks, point of sale systems and so on. Touch position sensors may also be used as control panels on appliances.

There are a number of different types of touch position sensors, such as resistive touch screens, surface acoustic wave touch screens, and capacitive touch screens. A capacitive touch screen, for example, may include an insulator, coated with a transparent conductor in a particular pattern. When an object, such as a finger or a stylus, touches or is provided in close proximity to the surface of the screen there is a change in capacitance. This change in capacitance may be sent to a controller for processing to determine the position of the touch.

A radio-frequency identification (RFID) tag can wirelessly exchange data with a RFID reader using radio communication. A RFID tag may include an integrated circuit and an antenna. RFID technologies have been used in a number of identification and tracking applications.

SUMMARY

The following disclosure describes examples that enable the integration of a RFID tag with a touch sensor.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to illustrate the relevant teachings. In order to avoid unnecessarily obscuring aspects of the present teachings, those methods, procedures, components, and/or circuitry that are well-known to one of ordinary skill in the art have been described at a relatively high-level.

Figure 1:
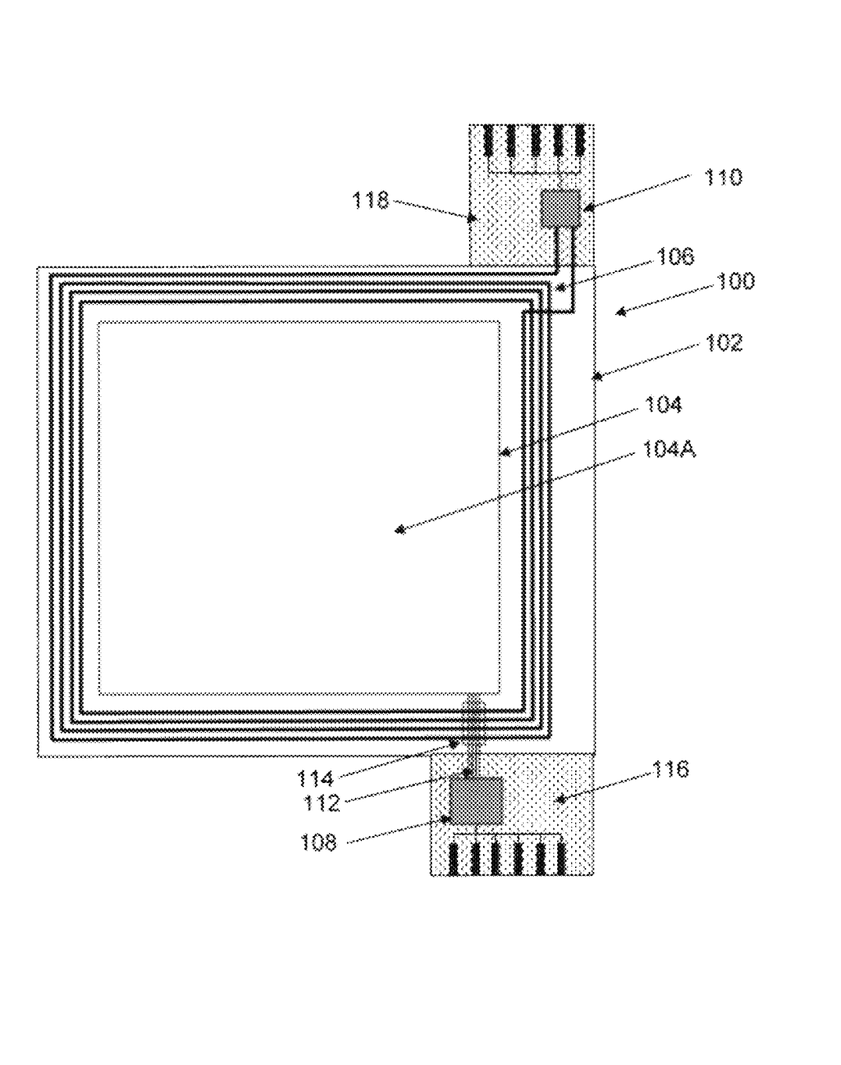
FIG. 1 illustrates schematically a first exemplary panel that includes a touch position sensor and a RFID tag.

FIG. 1 illustrates an example of a panel 100 that can be used in a touch sensing application. The panel 100 includes a capacitive touch position sensor 104 with a touch sensing area 104A and a touch controller 108 mounted on a circuit board 116. The panel 100 also includes a RFID controller 110 mounted on a circuit board 118 and in electrical connection with a RFID antenna 106 formed from a conductive material. The RFID antenna 106 and some or all of the electrodes of touch position sensor 104, along with associated connecting lines 112 for connecting the electrodes to the printed circuit 108, may be provided on a common surface of substrate 102. As shown, however, the touch controller 108 and RFID controller are mounted on a flexible printed circuit board which may be bonded to the substrate 102, for example by an anisotropic conductive film (ACF). In various configurations, the one or both surfaces of the substrate 102 may be used for touch sensing and RFID functions.

Light may be transmitted through the touch position sensing area 104A so that light emitted from a light source (not shown) underlying the touch position sensor 104, such as a backlight or a display, is visible to a user of the touch position sensor 104. The RFID antenna 106, on the other hand, is outside touch sensing area 104A and as such may or may not be substantially transparent.

Exemplary displays for use with panel 100 include, without limitation, liquid crystal displays, electronic ink displays, organic light-emitting diode displays, plasma displays and cathode ray tube displays.

In the example of FIG. 1, the touch position sensor 104 and the RFID antenna 106 are connected to separate controller circuits 108 and 110 that are mounted on printed circuit boards 116, 118, respectively. The controller circuits 108 and 110 may be mounted on one or more flexible printed circuit boards (FPCBs). The FPCBs may provide connections of the touch position sensor 104 and/or the RFID antenna 106 to respective control units 108, 110. In other examples, both the touch position sensor 104 and the RFID antenna 106 may be connected to a single control unit. The control unit associated with touch position sensor 104 may provide one or both of the functions of driving electrodes of the touch position sensor 104 and processing signals received from the touch position sensor 104 to determine the position of a touch.

The RFID ID data may be read by or written by a RFID reader/writer. The RFID tag can be active, passive or semipassive.

The RFID antenna 106 may be provided in any arrangement relative to the touch position sensor 104. The RFID antenna 106 in FIG. 1 surrounds the touch position sensor 104, and conductivity of the RFID antenna 106 may prevent a build-up of electrostatic charge from discharging at an electrode of the touch position sensor 104. An insulating layer 114 may be provided between RFID antenna 106 and connecting line or lines 112 leading out from the touch position sensor 104. Although shown as being on the same surface of the substrate as the touch position sensor 104, the RFID antenna can be provided on the opposite side of the substrate as well.

Figure 2A:
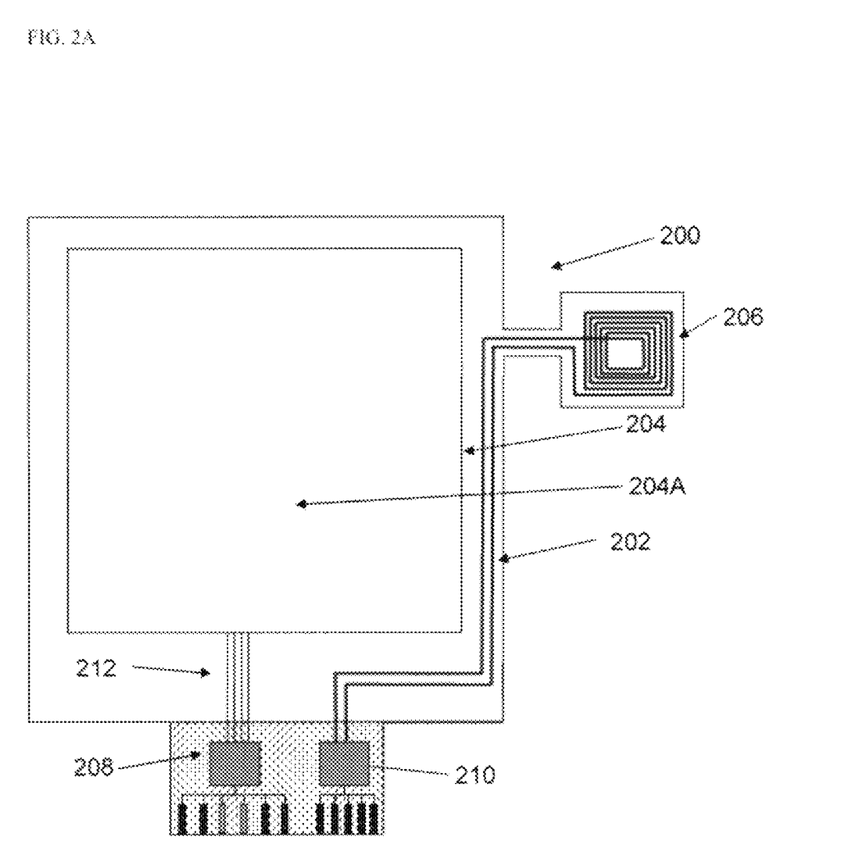
FIG. 2A illustrates schematically another exemplary panel that includes a touch position sensor and a RFID tag.

FIG. 2A illustrates another exemplary panel 200 including a capacitive touch position sensor 204 with a touch sensing area 204A. The panel 200 also includes a RFD tag having an antenna 206 formed from a conductive material arranged on the substrate with the touch position sensor 204. In this example, the RFID antenna 206 is provided on an area of the substrate separate from and adjacent to the touch sensing area 204A. As with the example of FIG. 1, some or all of the electrodes of touch position sensor 204, and associated connecting lines 212 for connecting the electrodes to controller 208, may be provided on a common surface or surfaces of substrate 102 while the controller 208 and the RFID controller 210 are located on flexible printed circuit board bonded to the substrate that houses the touch position sensor 204.

Figure 2B:
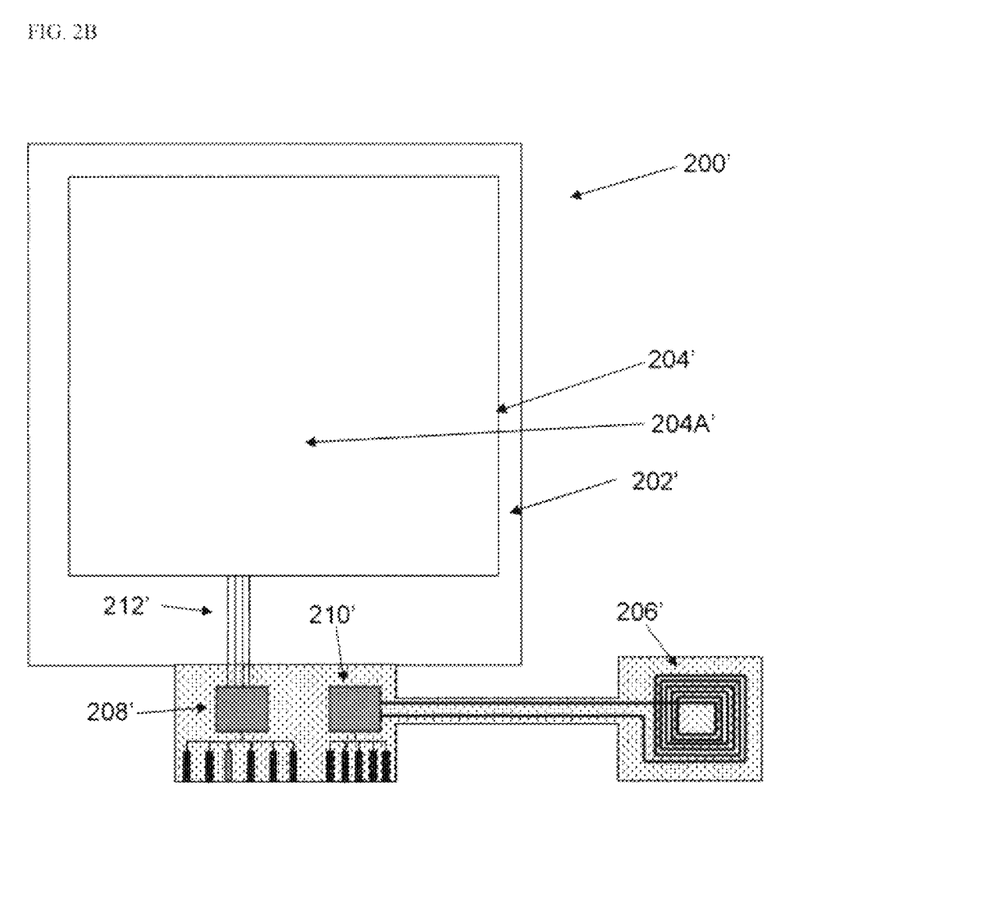
FIG. 2B illustrates schematically yet another exemplary panel that includes a touch position sensor and a RFID tag.

FIG. 2B illustrates another exemplary panel 200' including a capacitive touch position sensor 204' with a touch sensing area 204A', a controller circuit 208', a RFID controller circuit 210' and a RFID antenna 206' disposed on a flexible printed circuit board. The RFID antenna 206' can be formed from a conductive material. As with the example of FIG. 1, some or all of the electrodes of touch position sensor 204', and associated connecting lines 212 for connecting the electrodes to printed circuit 208', may be provided on a common surface of substrate 102' or different surfaces. In this example, the MD antenna 206' is provided on a peninsula of the flexible printed circuit board separate from and adjacent to the touch sensing area 204'. The RFID antenna can be provided on one or multiple layers of the flexible printed circuit board.

Figure 3:
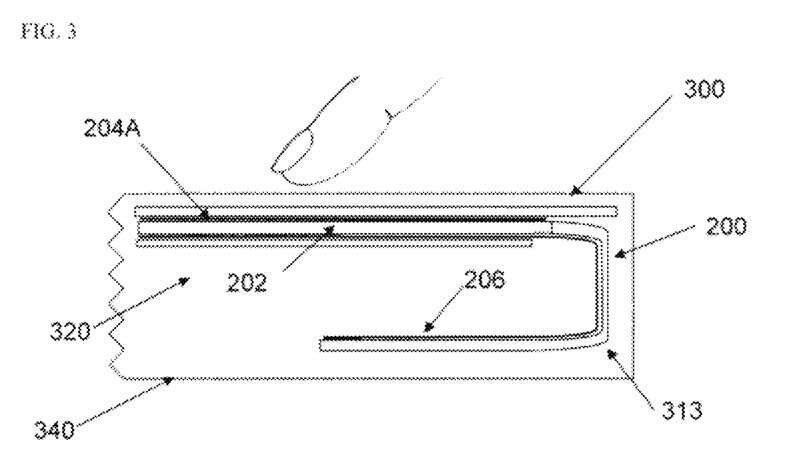
FIG. 3 illustrates schematically a cross section of a display device containing the panel of FIG. 2.

FIG. 3 illustrates a touch-sensitive display device 300 that includes a display 320 and a panel 200 like the panel illustrated in FIG. 2A. Although not shown for simplicity, the device 300 may use a panel like the panel shown in FIG. 2B. Substrate 202 is connected to a flexible printed circuit board 313, and is arranged such that the touch position sensing area 204A overlies the display. The flexible printed circuit board 313 can be located outside touch position sensing area 204A and may be curled or folded in order to fit within device housing 340, and RFID antenna 206 may be provided on a curled or folded portion of the flexible printed circuit board. At least part of the housing 340 may be transparent to allow light emitted by display through touch position sensing area 204 to be visible to a device user, and the RFID antenna 206 may be located within a part of the housing 340 that is not visible to the device user.

The RFID antenna 206 and its connecting lines may be provided on an inner surface of the substrate 202 following curling or folding, which may avoid stretching or breakage of the antenna connectivity that may occur during curling or folding of the substrate.

Although shown as separate controllers, the functionality of the RFID controller 110, 210 and the touch sensor controller 108, 208 can be provided in a single controller. The combined controller can be located on either the flexible printed circuit board, the substrate or some other location as long as connectivity is retained and depending on the application The RFID tag of panel 100 illustrated in FIG. 1 and the RFID tags of panels 200, 200' illustrated in FIG. 2A and FIG. 2B may be of a type selected from any suitable RFID tag technology, including by way of example passive RFID tags, semi-passive RFID tags and active RFID tags. In the case of an active RFID tag, the tag may be connected to the same power source as the touch position sensor 104 of FIG. 1 or 204 of FIG. 2, or to a separate power source.

The touch position sensor 104 of FIG. 1, 204 of FIG. 2A or 204' of FIG. 2B may be selected from any suitable capacitive sensor, including mutual-capacitance and self-capacitance sensors. Self-capacitance sensors include individual electrodes. Mutual capacitance type sensors as discussed in most of the examples below, have drive electrodes and sense electrodes. Some or all of the electrodes of the touch position sensor 104 of FIG. 1, 204 of FIG. 2A or 204' of FIG. 2B may be formed on the same substrate surface as the respective RFID antenna 106, 206 or 206'.

Figure 4A:
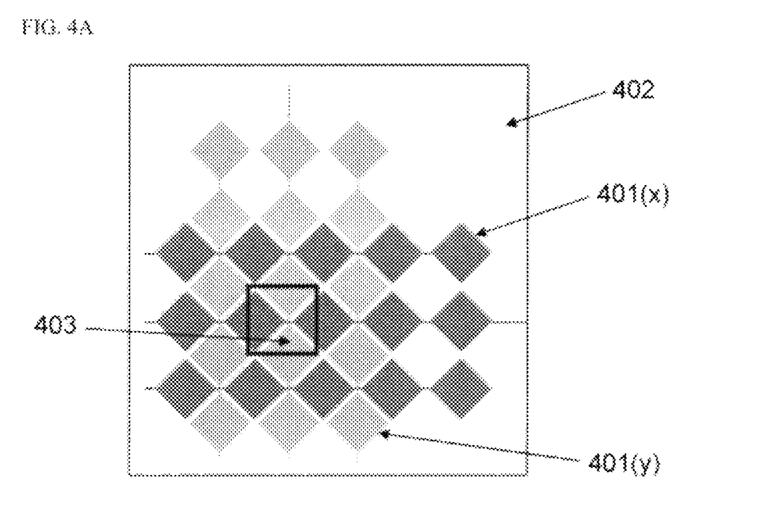
FIG. 4A illustrates schematically a plan view of a portion of an exemplary panel.
Figure 4B:
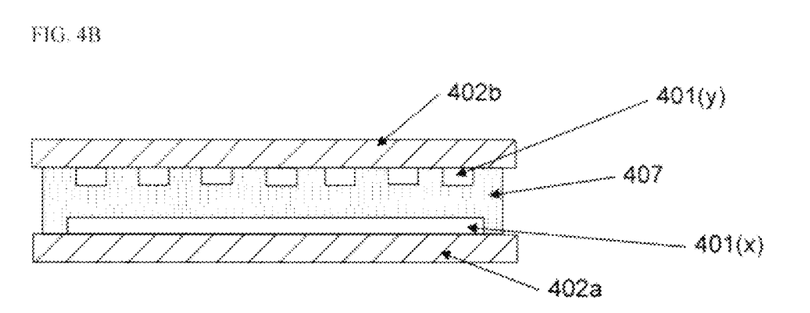
FIG. 4B illustrates schematically a cross section of the relevant layers of an arrangement of drive and sense electrodes of an exemplary panel using two substrates.
Figure 4C:
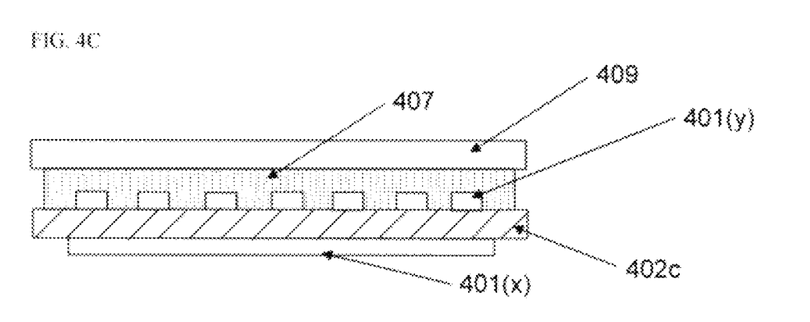
FIG. 4C illustrates schematically a cross section of the relevant layers of another arrangement of drive and sense electrodes of an exemplary panel using one substrate.

Each of FIGS. 4A to 4C shows an arrangement of drive electrodes 401($x$) and sense electrodes 401($y$) of a capacitive touch position sensor, for example capacitive touch position sensor 104 of FIG. 1, 204 of FIG. 2A or 204' or FIG. 2B.

With reference to FIG. 4A, the drive electrodes 401($x$) and the sense electrodes 401($y$) of a capacitive sensor may be arranged in electrical isolation from each other on the same surface of substrate 402; however, multiple surfaces can also be used. It will be appreciated that the sense and drive electrodes may have any shape and arrangement. For example, drive electrodes 401($x$) may surround sense electrodes 401 ($y$). Capacitive sensing channels 403 are formed in the sensing area at the regions where edges of the drive electrodes 401($x$) and sense electrodes 401($y$) are overlap without shorting or are placed in close proximity to one another.

In other examples, drive electrodes 401($x$) and of sense electrodes 401($y$) of a capacitive sensor may be arranged on opposite surfaces of an insulating substrate so that the substrate provides the electrical isolation of the drive and sense electrodes from each other. An example of such a panel structure with one substrate will be discussed in detail with regard to FIG. 4C. In another example, the drive electrodes 401($x$) and sense electrodes 401($y$) may be formed on different substrates with an insulator provided between the drive and sense electrodes. An example of such a panel structure with two substrates will be discussed in detail with respect to FIG. 4B. If formed on different substrate surfaces, the electrodes may still use shapes similar to the electrodes of FIG. 4A or may have other shapes and relationships.

Referring first to FIG. 4B showing the relevant layers of a panel structure, the drive electrodes 401($x$) may be provided on a first substrate 402a extending in a first direction, and the sense electrodes 401($y$) may be provided on a second substrate 402b extending in a second direction. The drive electrodes 401($x$) and the sense electrodes 401($y$) are spaced apart by a layer of non-conducting material 407, for example, an optically clear adhesive. Capacitive sensing channels are formed at capacitive coupling nodes, which exist in the localized regions surrounding where the drive and sense electrodes 401($x$) and 401($y$) cross over each other and are separated by the non-conducting material 407. A node sensing area encompasses each or substantially each intersection formed by a crossover of a drive electrode and a sense electrode. Although not shown in this example, some implementations may include a transparent cover sheet.

In another arrangement illustrated in FIG. 4C showing the relevant layers of a panel structure, the sense electrodes 401 ($y$) and the drive electrodes 401($x$) are formed on opposing surfaces of the same substrate 402c. The substrate 402c may be formed of an insulating material. Capacitive sensing channels are formed at the capacitive coupling nodes which exist in the localized regions surrounding where the drive and sense electrodes 401($x$) and 401($y$) cross over each other and are separated by the insulating substrate 402c. A transparent cover sheet 409 may be spaced apart from the sense electrodes 401($y$). A suitable material, such as an optically clear adhesive layer 407, provides the spacing between and bonds the transparent cover sheet 409 to the electrodes 401($y$) and the substrate 402c.

Each of the various substrates 302, 402*a*, 402*b* and 402*c* and/or the cover sheet 409 may be formed from a transparent non-conductive material, such as glass or a plastic. Plastic substrates and cover sheets may be suitable where flexibility of the panel may be required. Examples of suitable plastic substrate materials that may be flexible include, but are not limited to, polyethylene terephthalate (PET), polyethylene naphthalate (PEN) and polycarbonate (PC). Examples of suitable plastic materials for a transparent cover sheet that may be flexible include, but are not limited to, polycarbonate and poly(methyl methacrylate) (PMMA).

FIGS. 4B and 4C represent two different examples of structures that may form the drive and sense electrodes for a mutual capacitance type touch sensing panel. Other structures also may be used. In the examples of FIGS. 4B and 4C, the drive and sense electrodes 401($x$), 401($y$) may form a pattern in the touch sensing area similar to that shown in FIG. 4A. Several other electrode patterns that may use structures like either of those shown in FIGS. 43 and 4C are discussed with regard to later examples.

Figure 5A:
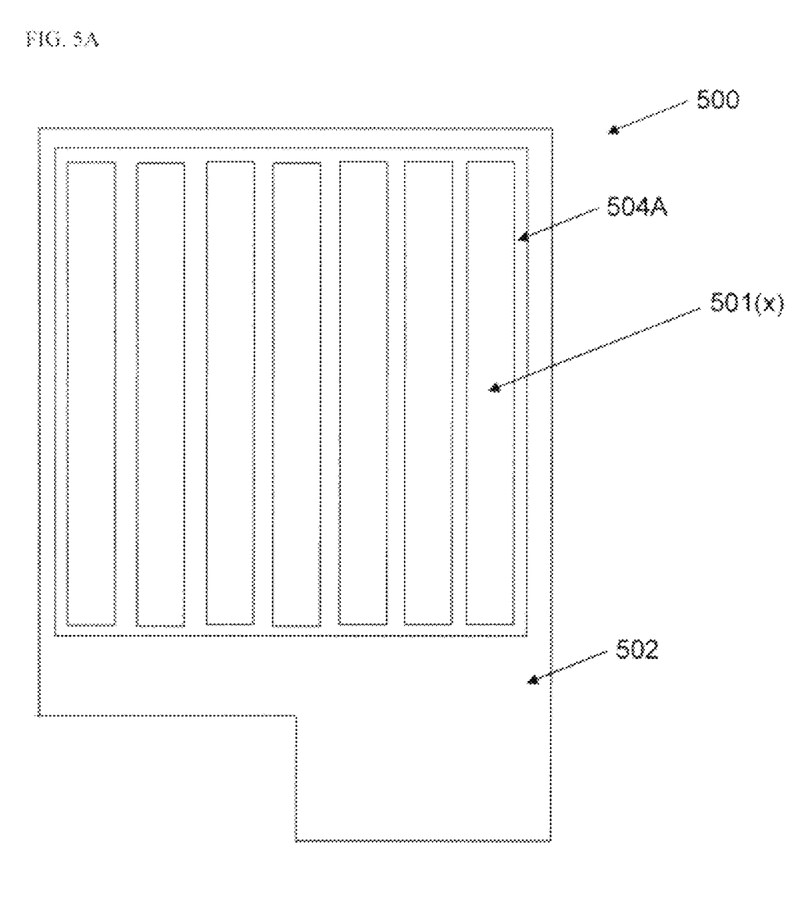
FIG. 5A illustrates schematically a first step in a first method of manufacture of a panel that includes a touch position sensor and a RFID tag.
Figure 5B:
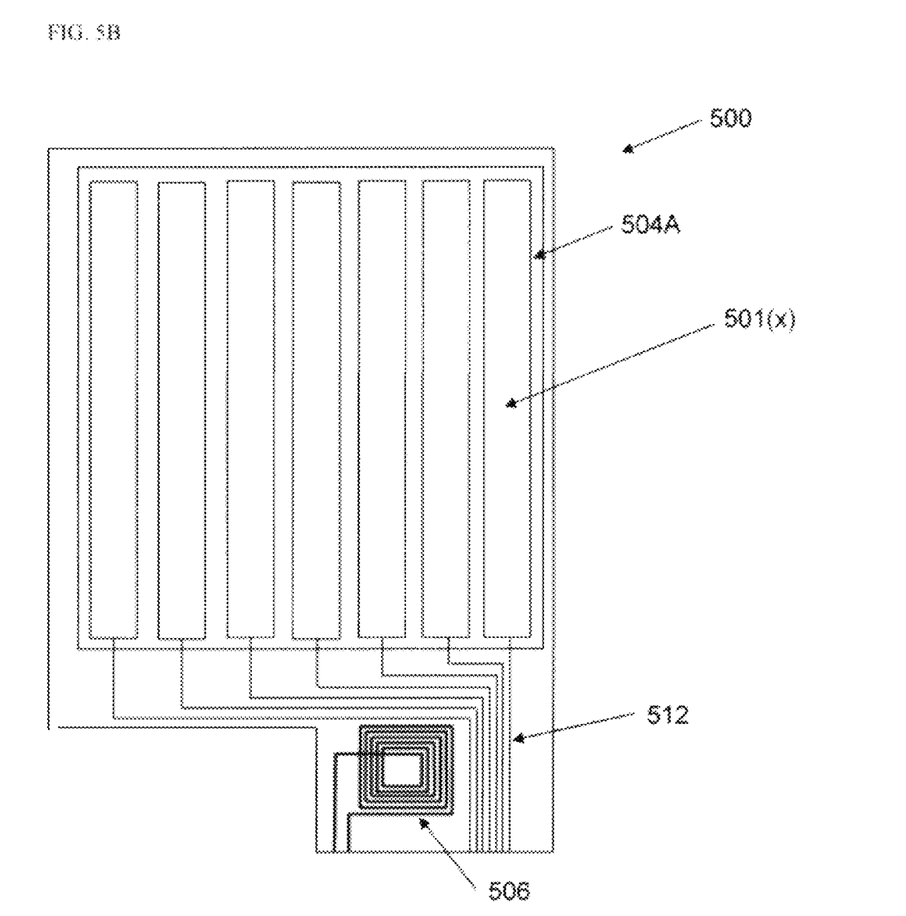
FIG. 5B illustrates schematically a subsequent step in the first method of manufacture of a panel that includes a touch position sensor and a RFID tag.

FIGS. 5A and 5B illustrate steps of a method of forming an exemplary panel 500 having a touch position sensor and a RFID tag. With reference to FIG. 5A in a first step, blocks of a transparent conductive material are formed on the surface of substrate 502 to form drive electrodes 501($x$). The space between adjacent drive electrodes 501($x$) may be made as narrow as possible, for example, to enhance shielding of the sense electrodes (not shown) against noise arising from the underlying display. At least 90% of the sensing area 504A may be covered by transparent conductive material of the drive electrodes, and the gap between adjacent drive electrodes 501($x$) may be no more than 300 microns. In such an example, substantially the whole of the area of each intersection with a sense electrode (not show in these illustrations for simplicity) may be shielded by the solid drive electrode blocks.

Suitable transparent conductive materials include transparent inorganic and organic conductive materials, such as ITO (indium tin oxide), ATO (antimony tin oxide), tin oxide, PEDOT or other conductive polymers, and carbon nanotube or metal nanowire impregnated materials.

In another step represented by FIG. 5B, RFID antenna 506 and connecting lines 512 for connection to a flexible printed circuit board (not shown in these illustrations for simplicity) may be formed on the same surface of substrate 502. RFID antenna 506 and connecting lines 512 may be formed in the same or similar processing step and/or from the same or similar material.

Suitable materials for forming RFID antenna 506 and connecting lines 512 include transparent conductive materials as described above and opaque conductive materials including copper, silver, gold, aluminum, tin and other metals suitable for use in conductive wiring.

Figure 6:
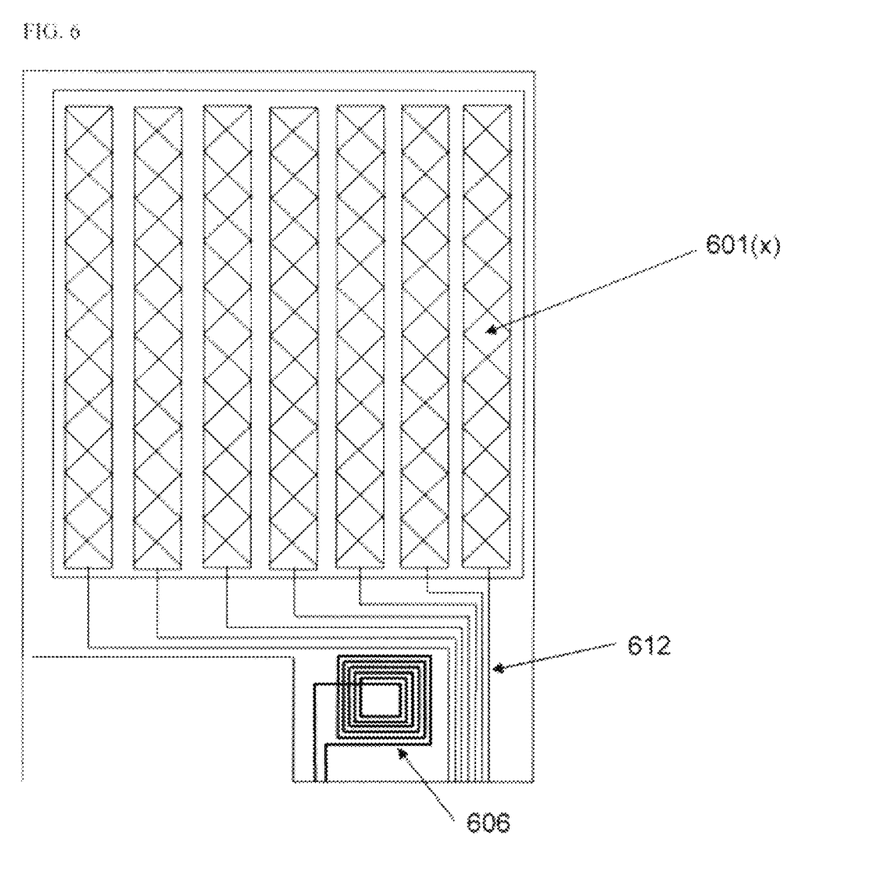
FIG. 6 illustrates schematically a panel of FIG. 2 formed by a second method of manufacture.

FIG. 6 illustrates a capacitive touch sensing panel 600 that is similar to the panel illustrated in FIG. 5B except that the drive electrodes 601($x$) are formed from a mesh pattern of narrow lines of opaque conductive material. The mesh is sized and patterned to allow transmission of light through the mesh electrodes. In this example, two or all of the drive electrodes 601($x$), the connecting lines 612 and the RFID antenna 606 may be formed from the same or similar material and/or in the same or similar processing step.

In another example, one or more of the drive electrodes may have both a block of transparent conductive material and a metal pattern of narrow lines in contact with the transparent conductive block.

In another step, the sense electrodes may be formed on the opposing surface of substrates 502 and 602 respectively, or on a separate substrate, to form a structure as illustrated in FIG. 4B or FIG. 4C.

FIGS. 5B and 6 illustrate formation of drive electrodes 501($x$) and 601($x$) and RFID antenna 506 and 606 on the same surface of a substrate 502 and 602 respectively. It will be appreciated that the RFID antenna may alternatively be formed on the same surface of a substrate as the sense electrodes. In addition, the RFID antenna may be formed on flexible printed circuit board.

Patterns of narrow conductive material lines may form a mesh pattern as illustrated in FIG. 6 or other pattern of narrow lines of an opaque conductive material that is sized and patterned to allow transmission of light through the electrodes. Suitable opaque conductor materials include copper, silver, gold, aluminum, tin and other metals suitable for use in electrical connectivity. The narrow lines may be from about 1 micron wide up to about 20 microns wide. Each electrode may include a mesh or other pattern of narrow lines formed of the appropriate electrode width. Narrower lines may reduce visibility to the naked eye. The fine conductive lines of the electrodes of an electrode layer may be formed such that up to about 10% of the touch sensing area is covered by an electrode material. Widths and spacings to provide coverage in the exemplary range allow for good transparency of the sensing panel. Configuring the line pattern to reduce the coverage percentage toward the lower end of the range, for example, around 3% or lower, increases transparency and reduces perceptible darkening or other loss of display quality.

The width of the drive and sense electrodes may depend on the touch-sensitive application in which the touch position sensor is to be used. The drive and/or sense electrodes of a mutual capacitance touch position sensor may be up to about 20 mm wide. In an example using a transparent conductive material such as ITO, sense electrodes may be greater than about 0.2 mm wide and drive electrodes may be greater than about 3 mm wide. In an example using fine metal lines, each line may be greater than about 1 μm, but electrode widths may still be in the range of about 3 mm or larger. Similar dimensions may apply to electrodes of a self-capacitance touch position sensor.

A process of manufacturing any of the panels discussed above relative to FIGS. 1-6 includes patterning the RFID antenna, the electrodes of the touch position sensor and the electrode connecting lines. In the case where a layer of the electrodes of the touch position sensor includes ITO, the process of patterning the electrodes on the respective substrate may include depositing a positive or negative resist over unpatterned ITO on the substrate; exposing the photoresist to UV light through a mask of the appropriate pattern; developing the resist by washing away unexposed resist with a solvent; and etching away the exposed ITO areas using a suitable etchant. The exposed photoresist may be removed using a suitable solvent.

An example of a suitable etching liquid for use in removing exposed ITO is an etching acid. Examples of a suitable removal liquid for the photoresist include organic solvents. Other suitable positive and negative photoresists, etching liquids and photoresist removal liquids may be used.

As another example, ITO may be deposited on a substrate by sputtering ITO onto the substrate using a shadow mask having a pattern suitable for formation of electrodes in any of the shapes as described above.

Organic conductive materials such as PEDOT may be patterned using printing methods, such as ink-jet or screen printing.

If two or more of the RFID antenna, the electrodes of the touch position sensor and the electrode connecting lines are formed of ITO or PEDOT and formed on the same surface of the same substrate then the various elements of the to be formed of ITO or PEDOT may be formed at the same time in the same processing step(s).

Patterning narrow lines of a conductive material for the electrodes of the touch position sensor, patterning the connecting lines for the electrodes and/or patterning the RFID antenna may include deposition of the metal or other conductive material by evaporation through a mask in the appropriate pattern.

In other examples, the patterning of a narrow line conductive material for the electrodes, patterning of the connecting lines and/or patterning of the RFID antenna may be done by a printing process in which a conductive material or conductive material precursor is printed, for example, by inkjet printing, to form the appropriate electrode pattern. In the case where a catalytic precursor ink is used, the process involves treating the precursor ink to convert the precursor ink to a final conductive material, for example, by electroless plating. In another example, the substrate may be uniformly coated with a catalytic photosensitive ink. The ink may be exposed to UV light through a photomask or vector-exposed to UV light from a laser or other suitable light source and rinsed with solvent to wash away the unexposed ink. The remaining ink may be immersed in a metal plating bath to form the fine conductive lines. Suitable catalytic inks are commercially available.

The connecting lines and the RFID antenna are formed of lines of the same opaque conductive material and can be formed on the same surface of the same substrate at the same time in the same processing step(s) as the various elements of opaque conductive material.

Although some exemplary processes are given above for forming conductive elements of the touch sensing panel, it will be appreciated that any suitable way of forming these elements can be used in conjunction with the disclosure provided herein.

In the example of FIGS. 5B and 6, the touch position sensor is a mutual capacitance sensor in which drive and sense electrodes are formed on different surfaces of the same substrate or on two different substrates. However, the touch position sensor may be any suitable form of a capacitance sensor. Further examples of types of sensors usable as the touch position sensor include self-capacitance sensors in which electrodes are formed on one surface of a substrate or mutual capacitance sensors in which drive and sense electrodes are formed on the same surface.

In the case where electrodes of the touch position sensor are formed on two surfaces, then similar material and/or similar processing steps may be used in forming touch position sensor electrodes on both surfaces.

It will be appreciated that the same process may be applied to any capacitive touch sensing panel in which electrodes and a RFID antenna are formed on a common substrate surface.

The capacitive sensors described above can be attached to numerous electronic devices. Examples of the electronic devices include computers, personal digital assistants, satellite navigation devices, mobile phones, portable media players, portable game consoles, public information kiosks, point of sale systems and appliances. At least some of these types of electronic devices may include a central processor or other processing device for executing program instructions, an internal communication bus, various types of memory or storage media, for code and data storage and one or more network interface cards or ports for communication purposes.

A RFID tag, included in a panel with a touch position sensor as described herein, may be used to transmit information to or exchange information with a reader, for example in order to make payments, locking or unlocking doors or other objects, and/or to track movement of a device containing the RFID tag.

Various modifications may be made to the examples and examples described in the foregoing, and any related teachings may be applied in numerous applications, only some of which have been described herein. It is intended by the following claims to claim any and all applications, modifications and variations that fall within the true scope of the present teachings.

The invention claimed is:

1. A panel comprising: at least one substrate having a main portion that includes a sensing area and a peninsula portion that is separate from and outside the sensing area of the main portion; a plurality of electrodes on the at least one substrate disposed within the sensing area of the main portion of the at least one substrate and arranged to sense touch of an object within the sensing area; and a radio-frequency identification (RFID) tag disposed on the peninsula portion of the at least one substrate, wherein an antenna portion of the RFID tag does not overlap, in plan view on a common side of the at least one substrate, one or more connecting lines for connecting one or more of the plurality of electrodes to a controller disposed on a flexible printed circuit board coupled to the at least one substrate, the flexible printed circuit board being distinct from the peninsula portion of the at least one substrate.

2. The panel of claim 1 wherein the RFID tag is selected from the group consisting of an active RFID tag, a passive RFID tag, and a semi-passive RFID tag.

3. The panel of claim 1 wherein the plurality of electrodes are on a same substrate surface.

4. The panel of claim 1 wherein the plurality of electrodes comprise a drive electrode on a first surface of the at least one substrate and a sense electrode on another surface of the at least one substrate.

5. The panel of claim 1 wherein the plurality of electrodes and the RFID tag are disposed on the same surface of the at least one substrate.

6. The sensing panel of claim 1 wherein the peninsula portion of the substrate is folded underneath the main portion of the substrate.

7. A device comprising:
a panel, the panel comprising:
at least one substrate having a main portion that includes a sensing area and a peninsula portion that is separate from and outside the sensing area of the main portion;
a plurality of electrodes on the at least one substrate disposed within the sensing area of the main portion of the at least one substrate and configured to sense touch of an object within the sensing area; and
a radio-frequency identification (RFID) tag having an antenna portion disposed at least in part on the peninsula portion of the at least one substrate; and
control circuitry disposed on a flexible printed circuit board coupled to the at least one substrate, the flexible printed circuit board being distinct from the peninsula portion of the at least one substrate, the control circuitry configured to communicate with the electrodes, and to sense the touch of an object within the sensing panel;
wherein the antenna portion of the RFID tag does not overlap, in plan view on a common side of the at least one substrate, one or more connecting lines for connecting one or more of the plurality of electrodes to the control circuitry, the antenna portion of the RFID tag being coupled to the control circuitry disposed on the flexible printed circuit board.

8. The device of claim 7 wherein the plurality of electrodes are on a same substrate surface.

9. The device of claim 7 wherein the plurality of electrodes comprise a drive electrode on a first surface of the at least one substrate and a sense electrode on another surface of the at least one substrate.

10. The device of claim 7 wherein the plurality of electrodes and the RFID tag are disposed on the same surface of the at least one substrate.

11. The device of claim 7 wherein the peninsula portion of the substrate is folded underneath the main portion of the substrate.

12. An electronic device comprising: a touch sensor disposed in a housing of the electronic device, the touch sensor comprising: a sensing panel, the sensing panel comprising: a substrate having a main portion that includes a sensing area and a peninsula portion that is separate from and outside the sensing area of the main portion; and a plurality of electrodes on the substrate disposed within the sensing area of the main portion of the substrate and configured to sense the presence of an object; a radio-frequency identification (RFID) tag disposed on the peninsula portion of the at least one substrate; and control circuitry disposed on a flexible printed circuit board coupled to the substrate, the flexible printed circuit board being distinct from the peninsula portion of the substrate, the control circuitry configured to communicate with the sensing panel, and to sense the presence of an object in proximity to the sensing panel; wherein an antenna portion of the RFID tag does not overlap, in plan view on a common side of the at least one substrate, one or more connecting lines for connecting one or more of the plurality of electrodes to the control circuitry.

13. The electronic device of claim 12 wherein the RFID tag is selected from the group consisting of a passive RFID tag, an active RFID tag, and a semi-passive RFID tag.

14. The electronic device of claim 12 wherein the plurality of electrodes are on a same surface of the substrate.

15. The electronic device of claim 12 wherein the plurality of electrodes comprise a drive electrode on a first surface of the substrate and a sense electrode on another surface of the substrate.

16. The electronic device of claim 12 wherein the plurality of electrodes and the RFID tag are disposed on the same surface of the substrate.

17. The electronic device of claim 12 wherein the peninsula portion of the substrate is folded underneath the main portion of the substrate.

18. A panel comprising:
at least one substrate having a main portion that includes a sensing area;
a flexible printed circuit board bonded to a portion of the substrate;
a plurality of electrodes on the at least one substrate disposed within the sensing area of the main portion of the at least one substrate and arranged to sense touch of an object within the sensing area; and
a radio-frequency identification (RFID) tag disposed on the flexible printed circuit board and not on the at least one substrate, at least a portion of an antenna portion of the RFID tag being disposed on a peninsula portion of the flexible printed circuit board, wherein the antenna portion of the RFID tag does not overlap, in plan view on a common side of the at least one substrate, one or more connecting lines for connecting one or more of the plurality of electrodes to a controller.

19. The panel of claim 18 wherein the RFID tag is selected from the group consisting of an active RFID tag, a passive RFID tag, and a semi-passive RFID tag.

20. The device of claim 7 wherein the control circuitry disposed on the flexible printed circuit board comprises:
a first control unit configured to communicate with the electrodes, and to sense the touch of an object within the sensing panel; and
a second control unit to which the antenna portion of the RFID tag is coupled.

* * * * *